(12) United States Patent
Lundy

(10) Patent No.: US 11,173,842 B2
(45) Date of Patent: Nov. 16, 2021

(54) ADJUSTABLE MOUNTING MECHANISM FOR A REARVIEW ASSEMBLY

(71) Applicant: Gentex Corporation, Zeeland, MI (US)

(72) Inventor: Eric S. Lundy, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 150 days.

(21) Appl. No.: 16/571,846

(22) Filed: Sep. 16, 2019

(65) Prior Publication Data

US 2020/0101901 A1    Apr. 2, 2020

Related U.S. Application Data

(60) Provisional application No. 62/739,981, filed on Oct. 2, 2018.

(51) Int. Cl.
*B60R 1/00* (2006.01)
*B60R 1/04* (2006.01)

(52) U.S. Cl.
CPC ..................... *B60R 1/04* (2013.01)

(58) Field of Classification Search
None
See application file for complete search history.

(56) References Cited

U.S. PATENT DOCUMENTS

| | | |
|---|---|---|
| 596,207 A | 12/1897 | Hart |
| 1,800,797 A | 4/1931 | Hoople |
| 3,425,657 A | 2/1969 | Doyle |
| 4,254,931 A | 3/1981 | Aikens et al. |
| 4,435,042 A | 3/1984 | Wood et al. |
| 4,995,581 A * | 2/1991 | Koiwai ................ B60R 1/04 248/480 |
| 5,058,851 A | 10/1991 | Lawlor et al. |
| 5,100,095 A | 3/1992 | Haan et al. |
| 5,106,177 A | 4/1992 | Dolasia |
| 5,377,948 A | 1/1995 | Suman et al. |
| 5,377,949 A | 1/1995 | Haan et al. |
| 5,487,522 A | 1/1996 | Hook |
| 5,572,354 A * | 11/1996 | Desmond ............. B60R 1/04 359/265 |
| 5,615,857 A | 4/1997 | Hook |

(Continued)

FOREIGN PATENT DOCUMENTS

| | | | |
|---|---|---|---|
| CA | 2332287 A1 * | 7/2001 | ............... B60R 1/04 |
| EP | 0169734 B1 | 10/1989 | |

(Continued)

OTHER PUBLICATIONS

1st Notice of Amendment dated Apr. 21, 2020 for corresponding Chinese utility model application No. 201916411740, 1 page.

(Continued)

*Primary Examiner* — Steven M Marsh
(74) *Attorney, Agent, or Firm* — Price Heneveld LLP; Brian James Brewer

(57) ABSTRACT

A rearview assembly includes a housing. A connector is configured to be secured to a button inside a vehicle. The connector includes a mount connecting feature with a plurality of distinct connection locations. A mount includes a proximal end operably coupled with the housing and a distal end including a location feature configured to engage one of the plurality of distinct connection locations.

17 Claims, 8 Drawing Sheets

(56) References Cited

U.S. PATENT DOCUMENTS

| | | |
|---|---|---|
| 5,820,097 A | 10/1998 | Spooner |
| 5,931,440 A | 8/1999 | Miller |
| 5,984,482 A | 11/1999 | Rumsey et al. |
| 6,068,380 A | 5/2000 | Lynn et al. |
| 6,250,148 B1 | 6/2001 | Lynam |
| 6,326,613 B1 | 12/2001 | Heslin et al. |
| 6,341,523 B2 | 1/2002 | Lynam |
| 6,467,919 B1 | 10/2002 | Rumsey et al. |
| 6,483,438 B2 | 11/2002 | DeLine et al. |
| 6,516,664 B2 | 2/2003 | Lynam |
| 6,843,575 B2 | 1/2005 | Wachi |
| 6,968,736 B2 | 11/2005 | Lynam |
| 7,008,069 B2 | 3/2006 | Ostreko et al. |
| 7,156,358 B2 | 1/2007 | March et al. |
| 7,287,868 B2 | 10/2007 | Carter et al. |
| 7,717,394 B2 | 5/2010 | Tanaka et al. |
| 7,726,623 B2 | 6/2010 | Müller |
| 7,784,953 B2 | 8/2010 | Rumsey et al. |
| 8,134,117 B2 | 3/2012 | Heslin et al. |
| 8,201,800 B2 | 6/2012 | Filipiak |
| 8,210,695 B2 | 7/2012 | Roth et al. |
| 8,226,064 B2 | 7/2012 | Ohashi |
| 8,309,907 B2 | 11/2012 | Heslin et al. |
| 8,646,924 B2 | 2/2014 | Roth et al. |
| 8,925,891 B2 | 1/2015 | Van Huis et al. |
| 8,960,629 B2 | 2/2015 | Rizk et al. |
| 9,174,577 B2 | 11/2015 | Busscher et al. |
| 9,244,249 B2 | 1/2016 | Kim et al. |
| 9,272,665 B2 | 3/2016 | Minikey, Jr. |
| 9,573,525 B2 | 2/2017 | Minikey, Jr. et al. |
| 9,682,656 B2 | 6/2017 | Busscher et al. |
| 10,190,610 B1 | 1/2019 | Busscher et al. |
| 10,240,712 B2 | 3/2019 | Filipiak et al. |
| D858,618 S | 9/2019 | Roth |
| 10,406,982 B2 | 9/2019 | Hooper et al. |
| 2004/0207940 A1 | 10/2004 | Carter et al. |
| 2005/0174663 A1 | 8/2005 | Carter et al. |
| 2007/0096005 A1 | 5/2007 | March et al. |
| 2015/0224928 A1 | 8/2015 | Busscher et al. |
| 2017/0124982 A1* | 5/2017 | Roth ................... G02F 1/1533 |
| 2019/0176701 A1 | 6/2019 | Kremkow et al. |

FOREIGN PATENT DOCUMENTS

| | | |
|---|---|---|
| EP | 3078546 A1 | 10/2016 |
| GB | 2579055 A | 6/2020 |
| JP | 2004082829 A | 3/2004 |
| JP | 2007112206 A | 5/2007 |
| KR | 1020090135598 A | 7/2011 |
| KR | 1020110078721 A | 7/2011 |
| RU | 2083393 C1 | 7/1997 |
| SU | 1341081 A1 | 9/1987 |
| WO | 2010111173 A1 | 9/2010 |

OTHER PUBLICATIONS

Extended European Search Report dated May 28, 2021, for corresponding European application No. 19868933.3, 7 pages.

International Preliminary Report on Patentability dated Mar. 23, 2021, for corresponding PCT application No. PCT/IB2019/057785, 6 pages.

* cited by examiner

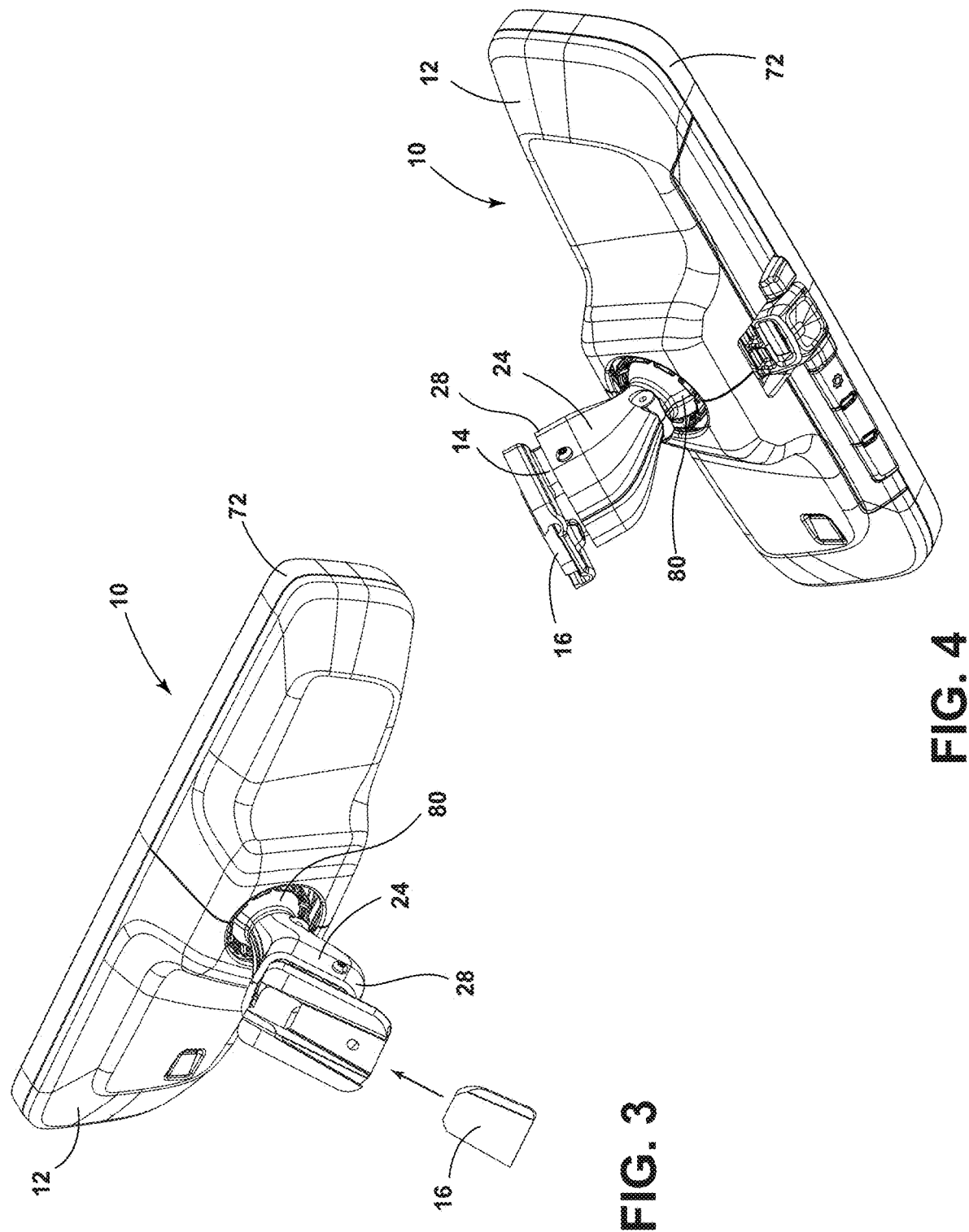

ADJUSTABLE MOUNTING MECHANISM FOR A REARVIEW ASSEMBLY

CROSS-REFERENCE TO RELATED APPLICATION

This application claims priority to and the benefit under 35 U.S.C. § 119(e) of U.S. Provisional Application No. 62/739,981 filed on Oct. 2, 2018, entitled "ADJUSTABLE MOUNTING MECHANISM FOR A REARVIEW ASSEMBLY," the disclosure of which is hereby incorporated herein by reference in its entirety.

FIELD OF THE DISCLOSURE

The present disclosure generally relates to a mount for a rearview assembly, and more particularly to an adjustable mounting mechanism for a rearview assembly.

SUMMARY OF THE DISCLOSURE

According to one aspect of the present disclosure, a rearview assembly includes a housing. A connector is configured to be secured to a button inside a vehicle. The connector includes a mount connecting feature with a plurality of distinct connection locations. A mount includes a proximal end operably coupled with the housing and a distal end including a location feature configured to engage one of the plurality of distinct connection locations.

According to another aspect of the present disclosure, a rearview assembly includes a housing and a connector that is configured to be secured to a button within a vehicle. The connector includes a mount connecting feature with a plurality of connection locations. A mount includes a proximal end defined by a ball with a wiring aperture that extends therethrough and is operably coupled with the housing and a distal end that includes a location feature configured to engage one of the plurality of connection locations. The mount includes two halves that are operably coupled around the button.

According to still another aspect of the present disclosure, a rearview assembly includes a housing and a connector that is configured to be secured to a button within a vehicle. The connector includes a mount connecting feature with a plurality of forward connection locations and a rearward receiving socket. A mount includes a proximal end that is operably coupled with the housing and a distal end that includes a forward flange that extends from a front wall of the mount and a rearward flange that extends from a rear wall of the mount. An internal boss is received by the rearward receiving socket.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 1A is a front perspective view of a rearview assembly of the present disclosure installed in a vehicle;

FIG. 3 is a top rear perspective view of the rearview assembly of FIG. 1 prior to engagement with a windshield button;

FIG. 4 is a bottom rear perspective view of the rearview assembly of FIG. 1 after engagement with a windshield button;

DETAILED DESCRIPTION

Figure 1:
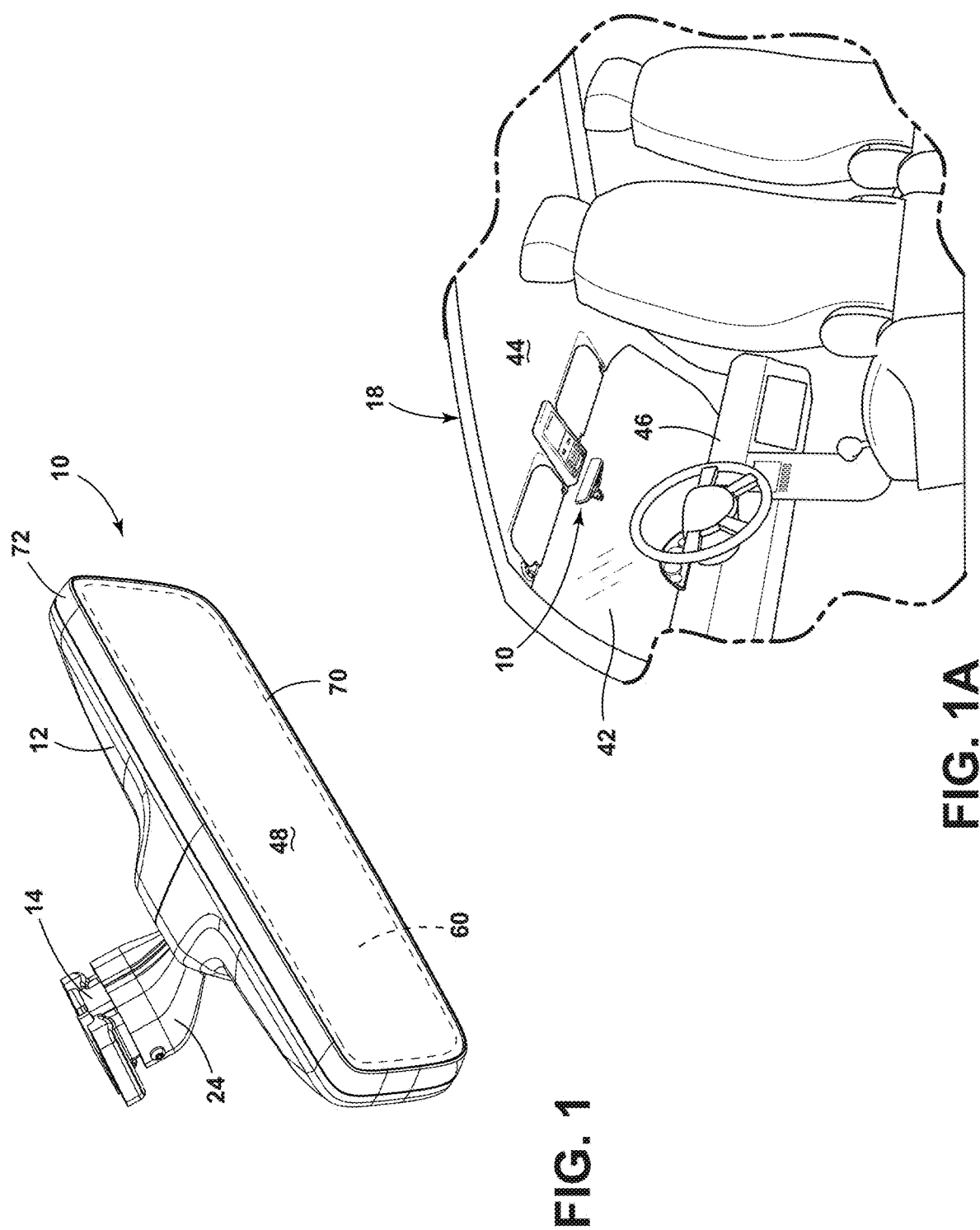
FIG. 1 is a top perspective view of a rearview assembly of the present disclosure.
Figure 2:
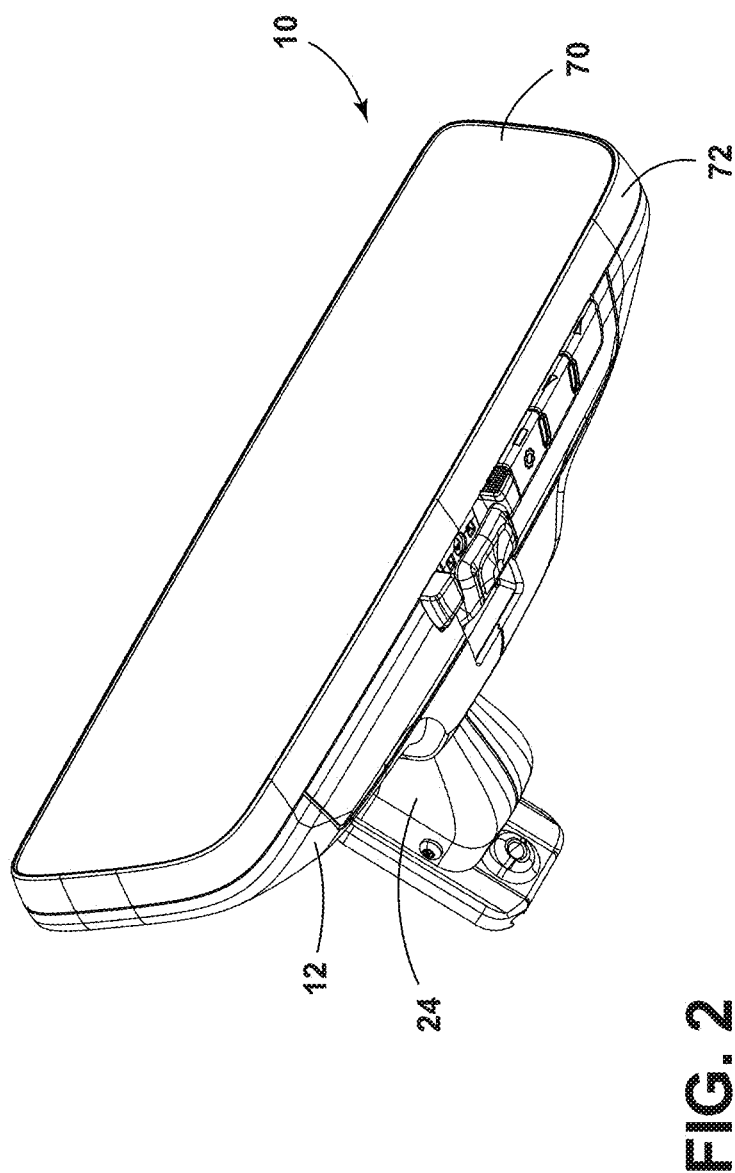
FIG. 2 is a bottom perspective view of the rearview assembly of FIG. 1.

The present illustrated embodiments reside primarily in combinations of method steps and apparatus components related to a an adjustable mounting mechanism for a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-9, reference numeral 10 generally designates a rearview assembly including a housing 12. A connector 14 is configured to be secured to a button 16 inside a vehicle 18. The connector 14 includes a mount connecting feature 20 with a plurality of distinct connection locations 22a, 22b, 22c. The plurality of distinct connection locations 22a, 22b, 22c of the connector 14 may include spaced ribs 23a, 23b configured to engage a location feature 30. A mount 24 includes a proximal end 26 operably coupled with the housing 12 and a distal end 28 including the location feature 30 that is configured to engage one of the plurality of distinct connection locations 22a, 22b, 22c. The mount 24 may include a wire passageway 40 configured to house a wire harness that may be operably coupled with a circuit board disposed in the housing 12. The circuit board may be operably coupled with a display 60 and an electro-optic element.

The rearview assembly 10 of the present disclosure is generally configured for use in the vehicle 18. The button 16 may be operably coupled with a windshield 42 or headliner 44 of the vehicle 18. However, it is also contemplated that the button 16, and ultimately the connector 14, may be operably coupled with another portion of the vehicle 18, including the dash 46. The rearview assembly 10 includes a glass surface 48 configured to provide a rearward view of the vehicle 18 to a driver. It will be understood that the rearward view may be generated by a reflection of a rearward portion of the vehicle 18 provided by an at least reflective surface of the rearview assembly 10. The reflection is then observed by the driver. Alternatively, the rearward view may be generated by the display 60 disposed within the rearview assembly 10. In this instance, an imager disposed inside or outside of the vehicle 18 captures image data and relays the image data to the display 60, which is then shown to the driver. The display 60 may be similar to that described in U.S. Pat. No. 8,879,139, which is hereby incorporated herein by reference in its entirety. It will be understood that the rearview assembly 10 may include both a reflective surface and the display 60

Figure 6:
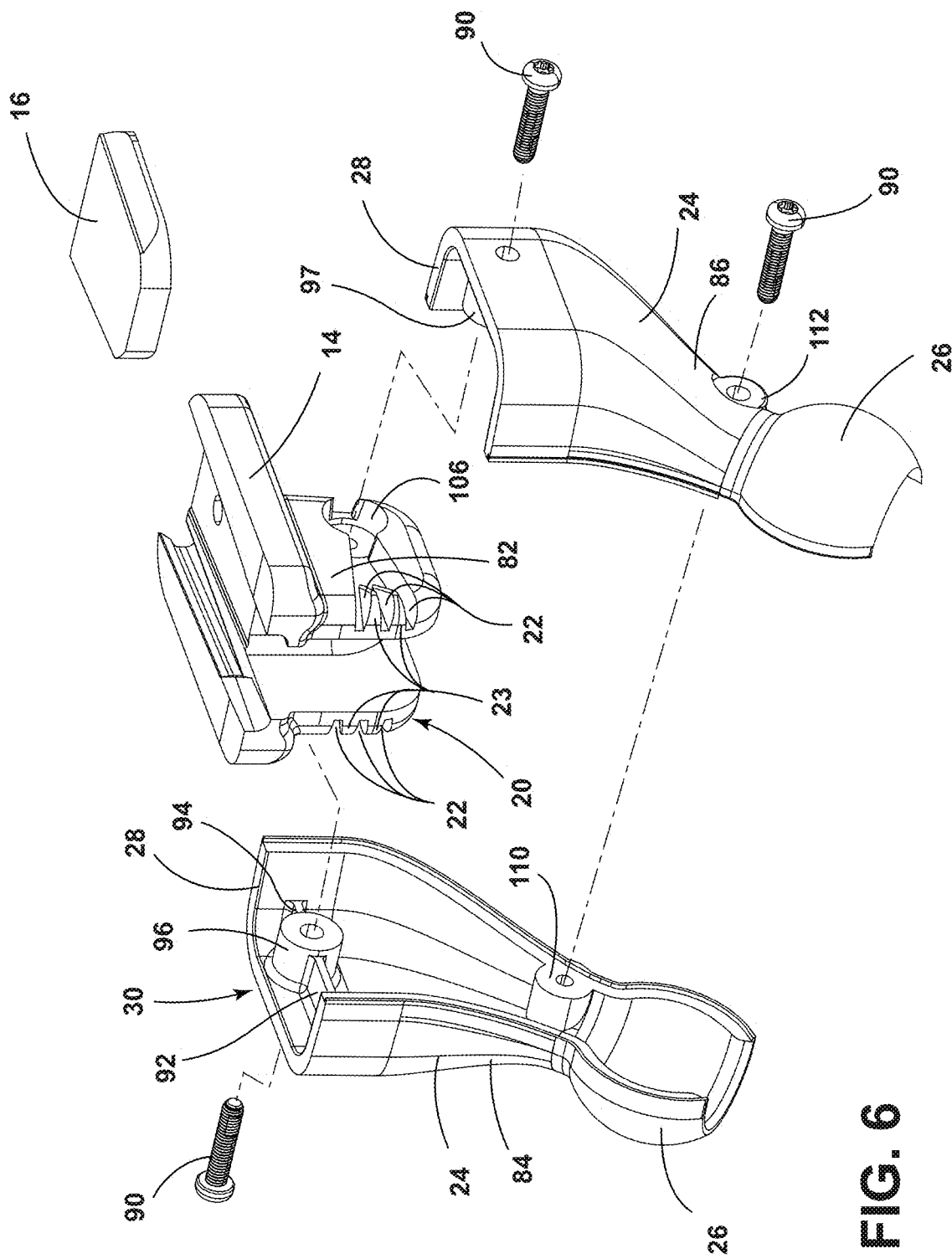
FIG. 6 is a front exploded perspective view of the mounting arrangement of FIG. 5.

The rearview assembly 10 may include a wide variety of functionality, including the use of an electro-optic assembly 70, which may include an electrochromic device that is configured to darken during certain lighting conditions. The glass surface 48 may be part of an electro-optic element or on a prism-type construction. The prism-type construction may generally include one glass surface 48 having a varying thickness from top to bottom. With an electro-optic element, the glass surface 48 includes at least two glass substrates. For example, as illustrated in FIG. 6, the glass surface 48 includes the front substrate as well as a rear substrate. One non-limiting example of an electro-optic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase.

The electrochromic component as disclosed herein may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use In Electrochromic Devices"; U.S. Pat. No. 6,519,072 entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety. The glass surface 48 may also be any other element having partially reflective, partially transmissive properties. To provide electric current to the glass surface 48, electrical elements are provided on opposing sides of the element, to generate an electrical potential therebetween. A J-clip is electrically engaged with each electrical element, and element wires extend from the J-clips to a primary printed circuit board (PCB).

With reference again to FIGS. 1-4, upon detection of a dark environment and glare detected by a rearward vehicle, the electro-optic assembly 70 may darken, thus minimizing the glare observed by the driver. However, the rearview assembly 10 may also include other features, including a temperature gauge, compass, rain sensor, etc. The glass surface 48 is surrounded by a bezel 72 that operably couples the electro-optic assembly 70 to the housing 12. The bezel 72 extends about the electro-optic assembly 70. However, it will also be understood that the rearview assembly 10 may be a bezel-less construction wherein the electro-optic assembly 70 interfaces directly with the rear housing 12. As illustrated, the mount 24 of the rearview assembly 10 is configured to engage the connector 14. The connector 14, in turn, engages the button 16. As illustrated, the button 16 slidably receives the connector 14. The proximal end 26 of the mount 24 includes a pivot connection, which may include a pivot ball 80 configured to allow rotation of the housing 12 relative to the mount 24. A wiring aperture may extend through the pivot ball 80. The housing 12 can be moved to an angle between 10 degrees and 60 degrees relative to the windshield 42. The distal end 28 of the mount 24 is configured to engage an engagement portion 82 of the connector 14. It will be understood that the mount 24 may include a first half 84 that is operably coupled with a second half 86, which are mirror images or nearly mirror images of one another and which can be secured about the engagement portion 82 of the connector 14.

Figure 5:
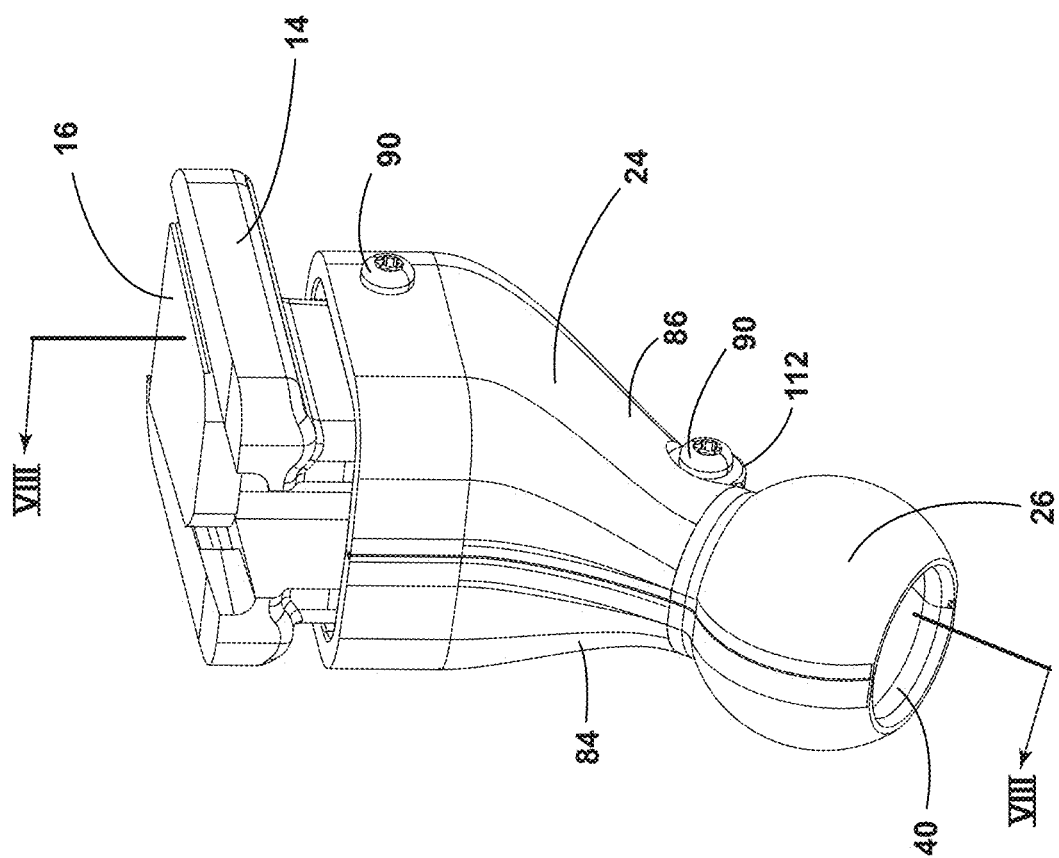
FIG. 5 is an enlarged perspective view of a mounting arrangement of a rearview assembly of the present disclosure.
Figure 7:
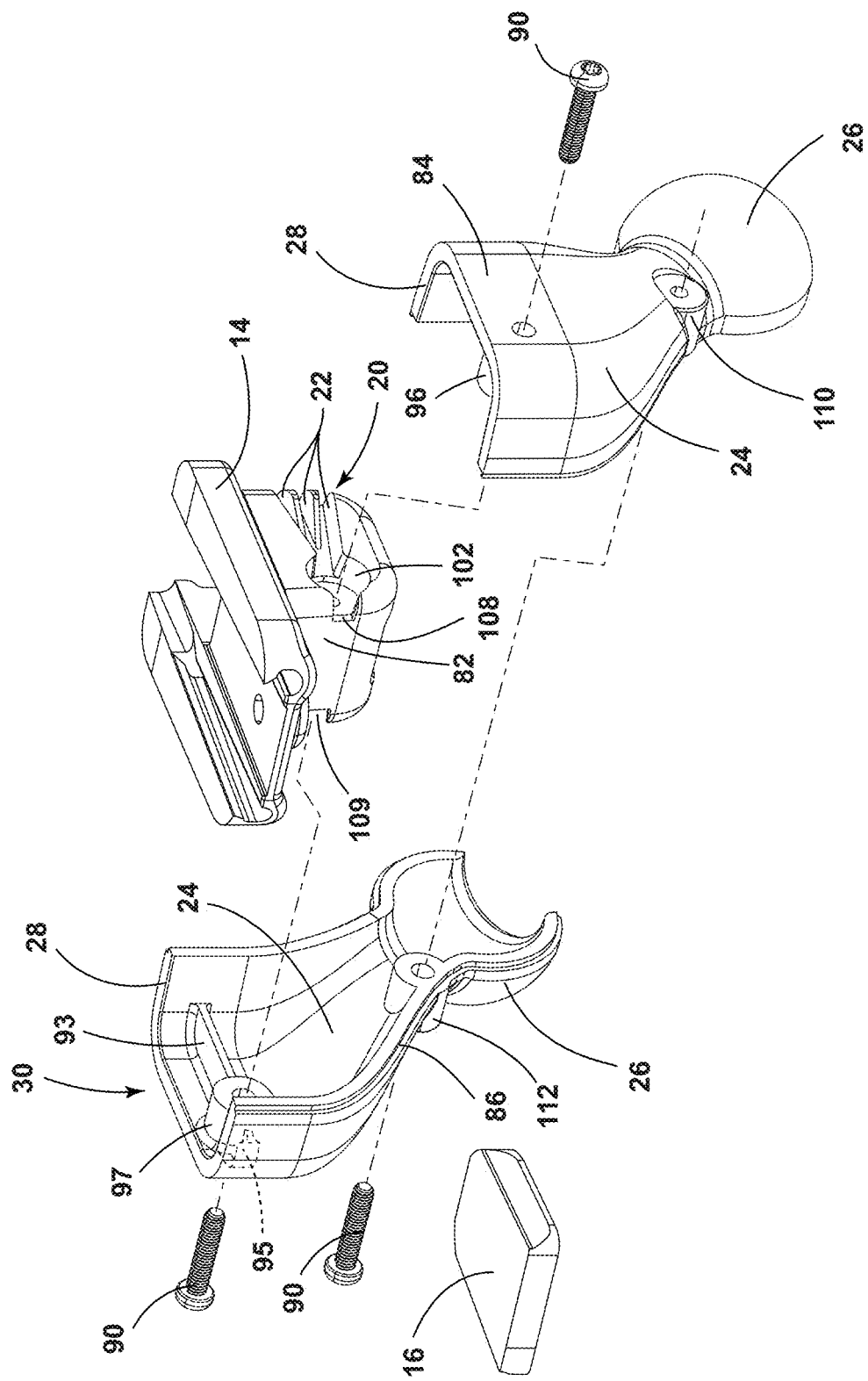
FIG. 7 is a rear exploded perspective view of the mounting arrangement of FIG. 5.

With reference now to FIGS. 5-7, the first and second halves 84, 86 of the mount 24 may be secured via mechanical fasteners 90 to one another and the engagement portion 82 of the connector 14. It is also contemplated that other manners of connecting the first and second halves 84, 86 of the connector 14 may be used. Upon selection of the desired angle of the mount 24 relative to the connector 14, the first and second halves 84, 86 can then be connected around the engagement portion 82 of the connector 14. As illustrated, the location feature 30 may include forward flanges 92, 93 and rearward flanges 94, 95 disposed within the mount 24. The first and second halves 84, 86 also include hubs 96, 97, respectively. The hub 96 is disposed between the forward flange 92 and the rearward flange 94 in the first half 84 (FIG. 6). Similarly, the hub 97 is disposed between the forward flange 93 and the rearward flange 95 in the second half 86 (FIG. 7).

Figure 9A:
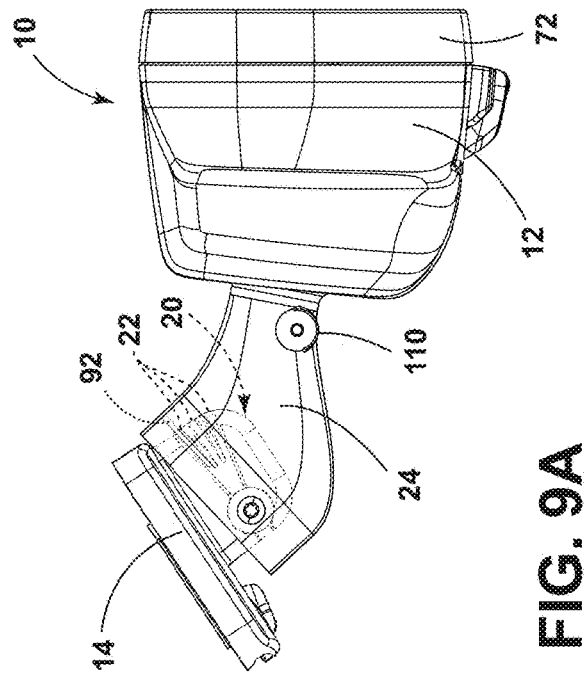
FIG. 9A is a side perspective view of one aspect of a rearview assembly of the present disclosure.
Figure 9B:
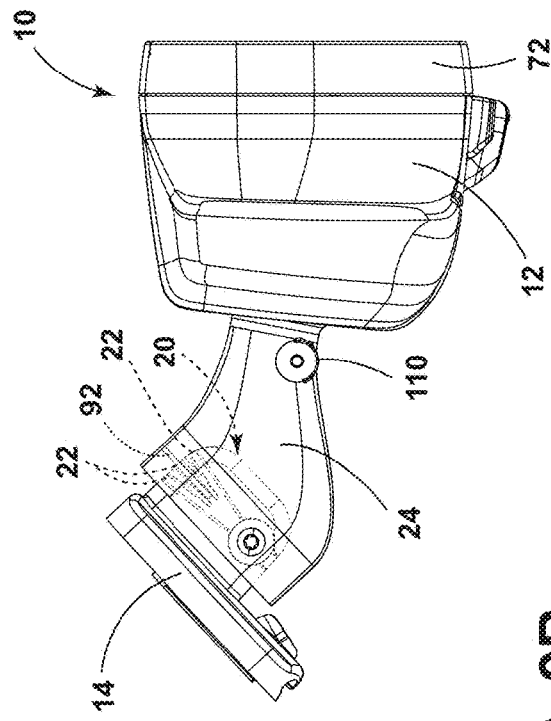
FIG. 9B is a side perspective view of another aspect of a rearview assembly of the present disclosure.
Figure 9C:
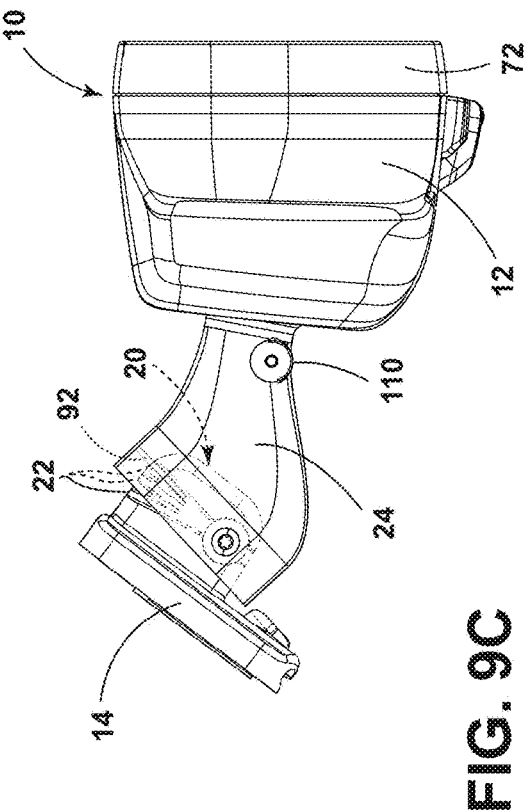
FIG. 9C is a side perspective view of another aspect of a rearview assembly of the present disclosure.

During installation, the location feature 30 of the first and second halves 84, 86 is positioned in one of the plurality of distinct connection locations, including uppermost, intermediate, and lowermost connection locations 22a, 22b, 22c, respectively, based on the desired angle of the mount 24 relative to the connector 14 and the general slope of the windshield 42 of the vehicle 18 (see FIGS. 9A-9C). More specifically, the forward flanges 92, 93 of the mount 24 are positioned within a preferred connection location 22a, 22b, 22c. The connection locations 22a, 22b, 22c are generally slots defined in the engagement portion 82 by ribs 23a, 23b. More specifically, an upper rib 23a extends between the uppermost and intermediate connection locations 22a, 22b and a lower rib 23b is disposed between the intermediate and lowermost connection locations 22b, 22c. The hub 96, which also generally defines a cylindrical boss of the first half 84 is aligned with and engages a cylindrical recess 102 that generally defines a receiving socket set and which is disposed in the engagement portion 82 of the connector 14 (FIG. 7). In a similar fashion, the hub 97, which generally defines a cylindrical boss of the second half 86 is aligned with and engages a cylindrical recess 106 that generally defines a receiving socket and which is disposed in the engagement portion 82 of the connector 14 (FIG. 6), on an opposite side of the engagement portion 82 from the first cylindrical recess 102. Each cylindrical recess 102, 106 includes a fastener receiver. Both the hub 96 and the hub 97 are internal hubs and are not generally visible when the first and second halves 84, 86 are connected. In addition, the rearward flanges 94, 95 of the mount 24 are positioned within apertures 108, 109 of the connector 14, respectively. After engagement of the location feature 30 with the select one of the plurality of connection locations 22a, 22b, 22c, the fasteners 90 are then engaged with the engagement portion 82 of the connector 14. More specifically, as shown in the illustrated view of FIG. 7, the mechanical fasteners 90 extend at least partially into or through the cylindrical hubs 96, 97 and into secure engagement with the engagement portion 82 of the connector 14. Another mechanical fastener 90 extends through the connector 14 at lower bosses 110, 112 adjacent to the pivot ball 80 of the mount 24.

Figure 8:
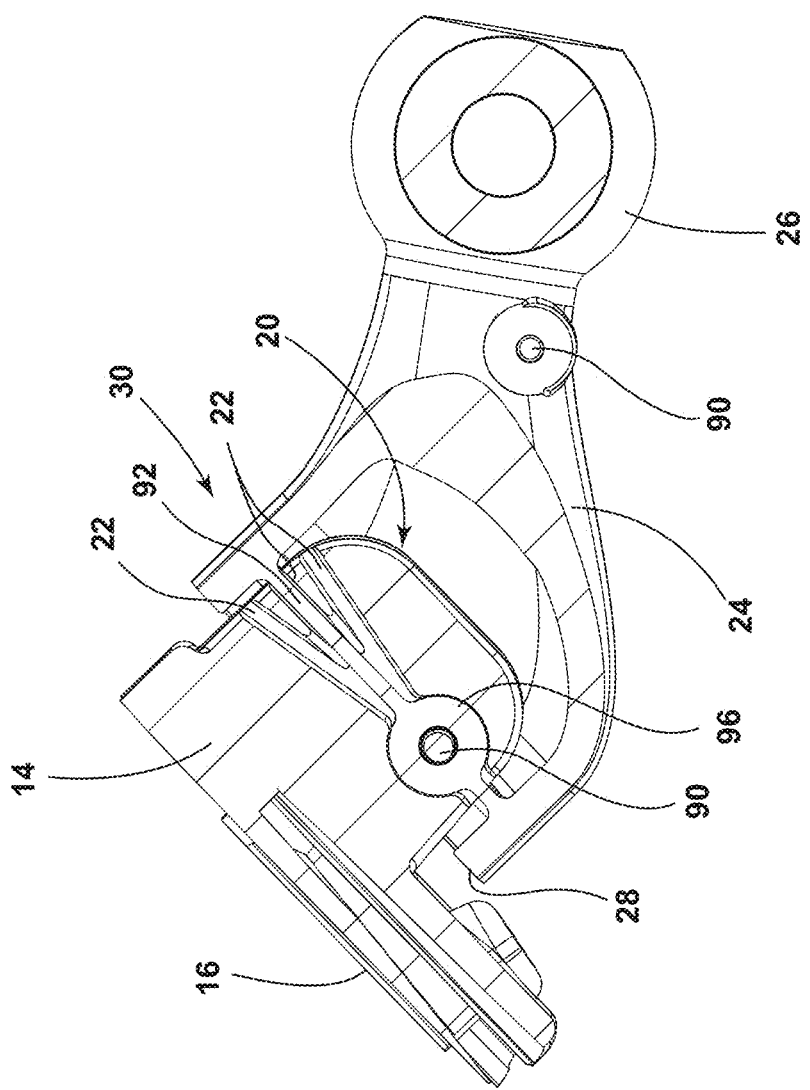
FIG. 8 is a side elevational cross-sectional view of the mounting arrangement of FIG. 5 taken at line IX-IX of FIG. 5.

With reference to FIGS. 8 and 9A-9C, the mount 24 is configured for engagement with the connector 14 at a variety of angles which may extend between 20 degrees and 40 degrees, although even larger angle changes (e.g., 10 degrees to 60 degrees, for example, is contemplated). The desired angle of the connector 14 with the mount 24 may be governed by the angle at which the button 16 is connected with the interior of the vehicle 18. For example, if the windshield 42 of the vehicle 18 is angled downward to an angle between 30 degrees and 40 degrees relative to a horizontal plane, the connector 14 may be engaged with the mount 24 at a 20 degree down location (FIG. 9A). This corresponds to the uppermost connection location 22a. Accordingly, that is where the location feature 30 is positioned (FIGS. 7 and 8). However, if the windshield 42 is angled downward to an angle between 40 degrees and 50 degrees relative to a horizontal plane, the angle between the connector 14 and the mount 24 may be adjusted to a 30 degree location (FIG. 9B). This corresponds to the intermediate connection location 22b. Accordingly, that is where the location feature 30 is positioned. In another instance, if the windshield 42 is angled downward to an angle between 50 degrees and 60 degrees relative to a horizontal plane, the angle between the connector 14 and the mount 24 may be adjusted to the 40 degree location (FIG. 9C). This corresponds to the lowermost connection location 22c. Accordingly, that is where the location feature 30 is positioned.

The versatility in angle that is provided in this disclosure helps arrange various rearview assemblies at various angles within a vehicle compensating for different windshield angles. Although a single ball mount construction is shown, a dual ball mount could also be provided. In addition, this system has improved vibration performance. Further, this mounting construction can be used from base model rearview assemblies through high end full display mirror assemblies. It is also contemplated that the ribs that define the plurality of connection locations may act to dissipate energy during head impact in the event of a collision. The ribs may controllably deform or rupture during head impact of a predetermined force.

According to an aspect of the present disclosure, a rearview assembly includes a housing. A connector is configured to be secured to a button inside a vehicle. The connector includes a mount connecting feature with a plurality of distinct connection locations. A mount includes a proximal end operably coupled with the housing and a distal end including a location feature configured to engage one of the plurality of distinct connection locations.

According to another aspect of the present disclosure, a plurality of distinct connection locations of a mount connecting feature include spaced ribs configured to engage flanges of the location feature.

According to yet another an aspect of the present disclosure, a housing can be moved to an angle between 10 degrees and 60 degrees relative to a windshield.

According to still another aspect of the present disclosure, a mount includes two halves that are operably coupled around a connector.

According to another aspect of the present disclosure, a mount defines a wire passageway configured to house a wire harness that is operably coupled with a circuit board disposed in a housing.

According to another aspect of the present disclosure, a circuit board is operably coupled with a display and an electro-optic element.

According to yet another aspect of the present disclosure, a plurality of distinct connection locations define slots that converge at a receiving socket.

According to still another aspect of the present disclosure, a receiving socket includes a fastener receiver.

According to another aspect of the present disclosure, a connector is configured to slidingly receive a button operably coupled with a windshield of a vehicle.

According to yet still another aspect of the present disclosure, a location feature includes flanges that extend from a front wall to a rear wall of a mount.

According to another aspect of the present disclosure, flanges intersect a cylindrical boss that extends into a receiving socket defined in a connector.

According to an aspect of the present disclosure, a rearview assembly includes a housing and a connector that is configured to be secured to a button within a vehicle. The connector includes a mount connecting feature with a plurality of connection locations. A mount includes a proximal end defined by a ball with a wiring aperture that extends therethrough and is operably coupled with the housing and a distal end that includes a location feature configured to engage one of the plurality of connection locations. The mount includes two halves that are operably coupled around the button.

According to another aspect of the present disclosure, a rearview assembly includes a housing and a connector that is configured to be secured to a button within a vehicle. The connector includes a mount connecting feature with a plurality of forward connection locations and a rearward receiving socket. A mount includes a proximal end that is operably coupled with the housing and a distal end that includes a forward flange that extends from a front wall of the mount and a rearward flange that extends from a rear wall of the mount. An internal boss is received by the rearward receiving socket.

According to yet another aspect of the present disclosure, a plurality of forward connection locations define slots that converge at the rearward receiving socket.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly comprising:
   a housing;
   a connector configured to be secured to a button within a vehicle, the connector including a mount connecting feature with a plurality of distinct connection locations; and
   a mount including a proximal end operably coupled with the housing and a distal end including a location feature configured to engage one of the plurality of distinct connection locations;
   wherein the location feature includes flanges that extend from a front wall to a rear wall of the mount; and
   wherein the flanges of the location feature intersect a cylindrical boss that extends into the receiving socket defined in the connector.

2. The rearview assembly of claim 1, wherein the plurality of distinct connection locations of the mount connecting feature include spaced ribs configured to engage flanges of the location feature.

3. The rearview assembly of claim 1, wherein the housing can be moved to an angle between 10 degrees and 60 degrees relative to a windshield.

4. The rearview assembly of claim 1, wherein the mount includes two halves that are operably coupled around the connector.

5. The rearview assembly of claim 1, wherein the mount defines a wire passageway configured to house a wire harness that is operably coupled with a circuit board disposed in the housing.

6. The rearview assembly of claim 5, wherein the circuit board is operably coupled with a display and an electro-optic element.

7. The rearview assembly of claim 1, wherein the plurality of distinct connection locations define slots that converge at a receiving socket.

8. The rearview assembly of claim 7, wherein the receiving socket includes a fastener receiver.

9. The rearview assembly of claim 3, wherein the connector is configured to slidingly receive the button operably coupled with the windshield of the vehicle.

10. A rearview assembly comprising:
    a housing;
    a connector configured to be secured to a button within a vehicle, the connector including a mount connecting feature with a plurality of connection locations; and
    a mount including a proximal end defined by a ball with a wiring aperture extending therethrough and operably coupled with the housing and a distal end including a location feature configured to engage one of the plurality of connection locations, wherein the mount includes two halves that are operably coupled around the button.

11. The rearview assembly of claim 10, wherein the location feature includes flanges that extend from a front wall to a rear wall of the mount.

12. The rearview assembly of claim 11, wherein the flanges intersect a cylindrical boss that extends into a receiving socket defined in the connector.

13. The rearview assembly of claim 10, wherein the mount defines a wire passageway configured to house a wire harness that is operably coupled with a circuit board disposed in the housing.

14. A rearview assembly comprising:
a housing;
a connector configured to be secured to a button within a vehicle, the connector including a mount connecting feature with a plurality of forward connection locations and a rearward receiving socket;
a mount including a proximal end operably coupled with the housing and a distal end including a forward flange that extends from a front wall of the mount and a rearward flange that extends from a rear wall of the mount; and
an internal boss that is received by the rearward receiving socket.

15. The rearview assembly of claim 14, wherein the plurality of forward connection locations define slots that converge at the rearward receiving socket.

16. The rearview assembly of claim 14, wherein the mount includes two halves that are operably coupled around the button.

17. The rearview assembly of claim 14, wherein the mount defines a wire passageway configured to house a wire harness that is operably coupled with a circuit board disposed in the housing.

\* \* \* \* \*